US009805367B2

(12) United States Patent
Le Buhan et al.

(10) Patent No.: US 9,805,367 B2
(45) Date of Patent: Oct. 31, 2017

(54) SYSTEM AND METHOD TO RECORD ENCRYPTED CONTENT WITH ACCESS CONDITIONS

(71) Applicant: Nagravision S.A., Cheseaux-sur-Lausanne (CH)

(72) Inventors: Corinne Le Buhan, Les Paccots (CH); Christophe Nicolas, Saint-Prex (CH); Joel Conus, Essertinessur-Yverdon (CH); Joel Wenger, Etoy (CH)

(73) Assignee: NAGRAVISION S.A., Cheseaux-sur-Lausanne (CH)

(*) Notice: Subject to any disclaimer, the term of this patent is extended or adjusted under 35 U.S.C. 154(b) by 0 days.

(21) Appl. No.: 15/187,830

(22) Filed: Jun. 21, 2016

(65) Prior Publication Data
US 2017/0098214 A1 Apr. 6, 2017

Related U.S. Application Data

(63) Continuation of application No. 13/995,516, filed as application No. PCT/EP2011/072127 on Dec. 7, 2011, now Pat. No. 9,395,207.
(Continued)

(30) Foreign Application Priority Data

Apr. 18, 2011 (EP) .................................. 11162894

(51) Int. Cl.
*G06Q 20/38* (2012.01)
*G01D 4/00* (2006.01)
(Continued)

(52) U.S. Cl.
CPC .......... *G06Q 20/382* (2013.01); *G01D 4/002* (2013.01); *G01D 4/008* (2013.01); *G01F 1/00* (2013.01);
(Continued)

(58) Field of Classification Search
CPC ...... G01R 21/00; G01R 21/133; G01R 11/04; G01R 22/065; G01F 15/14; G01F 15/063;
(Continued)

(56) References Cited

U.S. PATENT DOCUMENTS 3,928,788 A * 12/1975 Finnen .................. H02B 1/063
220/298
6,493,644 B1 * 12/2002 Jonker ................ G01R 21/133
702/182
(Continued)

FOREIGN PATENT DOCUMENTS

CN 101581591 A 11/2009
GB 2 460 517 A 12/2009
WO WO-2007/134397 A1 11/2007

OTHER PUBLICATIONS

International Search Report PCT/ISA/210 for PCT/EP2011/072127 dated Feb. 22, 2012.
(Continued)

*Primary Examiner* — Behrang Badii
(74) *Attorney, Agent, or Firm* — Harness, Dickey & Pierce, P.L.C.

(57) ABSTRACT

A secure detachable utility monitoring device is disclosed, to be appended to a utility metering apparatus for controlling at least one utility usage consumption. A detachable metering monitoring device of at least one embodiment includes: a usage reading interface to acquire a utility consumption value metered by the utility meter; a first memory to store at least a unique identifier ID and a personal key, both pertaining to the device; a crypto processor to generate a cryptogram from information data comprising at least the utility consumption value, the cryptogram being encrypted with the personal key; a message generator to generate an information message including at least the cryptogram and the unique identifier ID; and a communication network
(Continued)

interface including a sending unit to send the information message to a remote management center.

20 Claims, 4 Drawing Sheets

Related U.S. Application Data

(60) Provisional application No. 61/425,830, filed on Dec. 22, 2010.

(51) Int. Cl.
| | | |
|---|---|---|
| *G01R 21/133* | (2006.01) | |
| *G01F 1/00* | (2006.01) | |
| *G06Q 50/06* | (2012.01) | |
| *G01R 22/06* | (2006.01) | |
| *H02B 1/06* | (2006.01) | |
| *G01R 21/00* | (2006.01) | |
| *G01R 11/00* | (2006.01) | |
| *G01R 11/04* | (2006.01) | |
| *H02B 1/015* | (2006.01) | |

(52) U.S. Cl.
CPC ........... *G01R 21/133* (2013.01); *G06Q 50/06* (2013.01); *G01R 11/00* (2013.01); *G01R 11/04* (2013.01); *G01R 21/00* (2013.01); *G01R 22/065* (2013.01); *H02B 1/015* (2013.01); *H02B 1/06* (2013.01); *H02B 1/063* (2013.01)

(58) Field of Classification Search
CPC . G01F 1/00; G01D 4/02; G01D 4/002; G01D 4/008; H02B 1/015; H02B 1/03; H05F 3/02; G06Q 20/382; G06Q 50/06
See application file for complete search history.

(56) References Cited

U.S. PATENT DOCUMENTS

| | | | |
|---|---|---|---|
| 2003/0014200 A1* | 1/2003 | Jonker | G01R 21/133 702/60 |
| 2004/0254750 A1* | 12/2004 | Macfarlene | G01R 22/065 702/61 |
| 2006/0206433 A1 | 9/2006 | Scoggins | |
| 2007/0257813 A1 | 11/2007 | Vaswani et al. | |
| 2008/0250250 A1 | 10/2008 | Westerinen et al. | |
| 2009/0210197 A1 | 8/2009 | Cleary | |

OTHER PUBLICATIONS

Chinese Office Action and English translation thereof dated Sep. 24, 2015.

* cited by examiner

SYSTEM AND METHOD TO RECORD ENCRYPTED CONTENT WITH ACCESS CONDITIONS

This application is a continuation application of and claims priority under 35 U.S.C. §120/121 to U.S. application Ser. No. 13/995,516 filed Jun. 19, 2013, which is the national phase under 35 U.S.C. §371 of PCT International Application No. PCT/EP2011/072127 which has an International filing date of Dec. 7, 2011, which designated the United States of America and which claims priority to European patent application number EP 11162894.7 filed Apr. 18, 2011 and U.S. provisional application No. 61/425,830 filed Dec. 22, 2010, the entire contents of each of which are hereby incorporated by reference herein.

FIELD OF THE INVENTION

This invention concerns the field of securing utility usage monitoring against various hacking threats by means of meter reader plug-ins.

TECHNICAL BACKGROUND

The on-going deregulation in worldwide energy distribution markets is driving the need for smart utility distribution grids and smart meters, enabling both utility providers and consumers to monitor the detailed consumption of an end user at any time through open communication networks. The energy market is particularly concerned as of today but related issues are also relevant to other utility markets such as water or gas.

While a number of legacy meters already implement some point-to-point automated reading protocols using for instance standard optical or modem interfaces, they are not able to interact with either the end user home area network devices or the remote utility monitoring facilities using wireless or power line communication networks. The industry answer to this regulatory requirement in the next decade will therefore consist in swapping the legacy meters for so-called smart meters, which raises tremendous costs for the utility vendors and the consumers in the end.

Moreover, the resulting dependency of the basic metering functionality on remote communication messages raises significant concerns on the effective robustness to software bugs as well as emerging threats such as smart grid worms and viruses taking advantage of smart meter security design flaws that may not be known at the time of deployment, but may become critical later. This is particularly evident in the case of the remote disconnect feature, as a major disruption target for cyber-terrorism but also a possible entry point for local thieves as a way to disconnect some house alarms from their power source.

In practice, today's security designs for smart grids and smart meters are largely inspired by the telecommunication industry and a large part of them is subject to emerging standardization by international committees such as ANSI or IEC. However the requirements are very different, as telecommunication end devices such as mobile phones, set-top-boxes or even television receivers seldom exceed an operational lifetime of 10 to 20 years. In contrast, metering equipment is typically installed at the time of a house building and meant to last at least 20 years, if not 50 to 100 years.

Once the standard specifications are defined, it is no longer possible to update the design (for instance, cryptographic algorithms, key lengths and key management systems) without breaking compliance, which is a major issue in deregulated markets where any metering device model from any manufacturer needs to operate with any utility provider infrastructure and this possibly for the next 50 to 100 years.

There is therefore a need for alternative solutions clearly separating the advanced but complex and security sensitive monitoring functionality from the basic but proven utility delivery and consumption measurement functionality. In this approach, the fully operational legacy meters do not need to be upgraded, which also helps saving upgrade costs and smart meter manufacturing energy.

Separation of the remote monitoring functionality from the basic legacy metering functionality typically requires a detachable monitoring device, including at least:

A reader sensor interface to be connected to the legacy meter display or electrical reading interface (serial, optical etc).

A memory to buffer the utility usage information prior to reporting it.

One or several network communication interfaces to report back the data to either the utility network and/or the end user home area network, in compliance with existing regulations and relevant technical standards.

A processor in charge with monitoring the reading, storing and reporting operations.

Such detachable monitoring solutions and associated data management systems have already been described, for instance in WO07134397 or GB 2460517. Some related devices are also now commercialized for instance by Pilot-Systems (http://www.pilotsystems.com) and Xemtec (http://www.xemtec.ch), but none of this prior art addresses the security enforcement functionality.

In order to fully address the utility usage consumption hacking threat, it is important to prevent hacking on all individual components in the end-to-end communication chain. As opposed to smart meters, legacy meters LM as the first component in the end-to-end communication chain have no interfaces to open networks, so their hacking requires a local mechanical operation with certain safety and tamper evidence concerns, as meters are typically sealed by utility vendors everywhere in the world. On the other end of the chain, state of the art cryptographic design is applied to communications between the monitoring module and the utility infrastructure over open networks, but this security is just as secure as the secrecy of underlying keys. A tamper proof design on the monitoring module device side is therefore of primary importance.

SUMMARY OF THE INVENTION

The object of the invention is thus to eliminate the drawbacks of the prior art and to provide a secure detachable utility monitoring device to be appended to a utility metering apparatus for controlling at least one utility usage consumption.

This is achieved thanks to a detachable metering monitoring device to be connected with a utility meter for controlling at least one utility consumption metered by said utility meter, comprising:

a usage reading interface to acquire a utility consumption value metered by said utility meter, a first secure memory to store at least a unique identifier ID and a personal key, both pertaining to said device, a crypto processor to generate a cryptogram from information data comprising at least the utility consumption value, said cryptogram being encrypted with said personal key, a message generator to generate an information message including at least said cryptogram and the unique identifier ID, a sending unit to send the information message to a remote management center.

The utility metering apparatus permanently (or periodically) measures the utility usage consumption while the detachable metering monitoring device reads the utility usage consumption from said apparatus on a regular basis with a usage reading interface or any means to acquire at least one utility consumption metered by the utility metering apparatus. The detachable metering monitoring device can buffer the utility consumption and is able to report it to a utility usage monitoring infrastructure through a communication interface, in particular to a remote management center by means of a sending unit. The detachable metering monitoring device is also provided with a first secure memory to store at least a unique identifier ID and a personal key; this unique identifier and this private key pertaining to this device. The detachable metering monitoring device is provided with a crypto processor to generate a cryptogram from information data comprising at least the utility consumption value; this cryptogram being encrypted with the personal key of the detachable metering monitoring device. This device also comprises a message generator or any other means to generate an information message including at least the cryptogram and the unique identifier ID. This information message can be sent to the remote management center by using the sending unit of the communication interface.

The device could further comprise a security module in charge with handling the security sensitive data, security processing and security messaging associated with said reporting to said utility usage monitoring infrastructure.

Other embodiments of the present invention will be described in the following detailed description.

DETAILED DESCRIPTION

Figure 1:
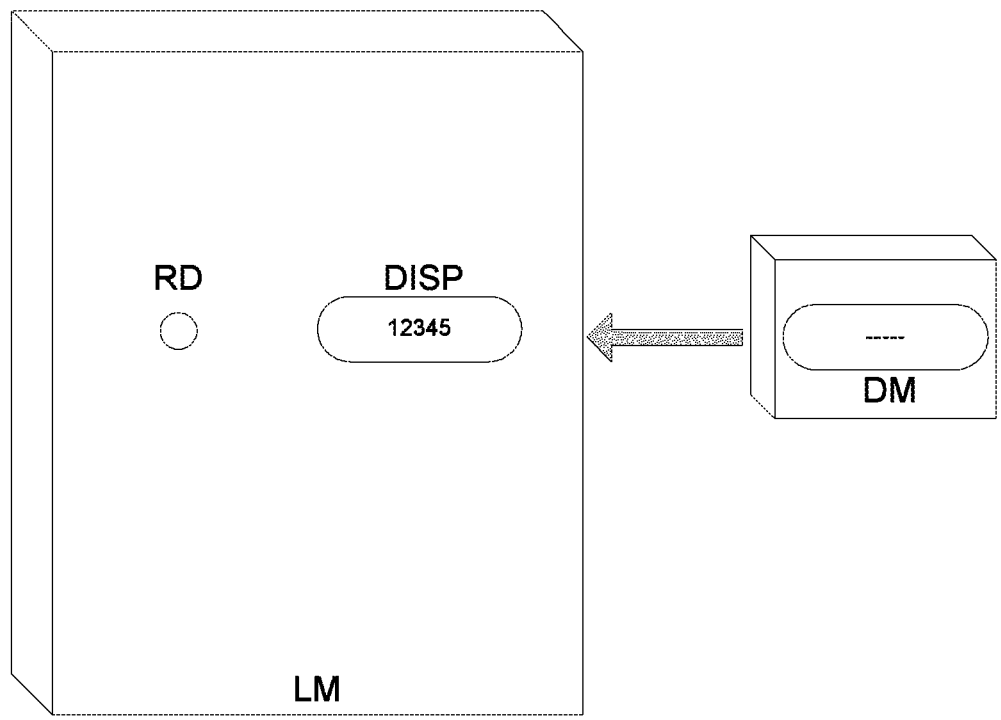
FIG. 1 shows a legacy meter LM and a detachable monitoring device DM that can be appended to the legacy meter.
Figure 2:
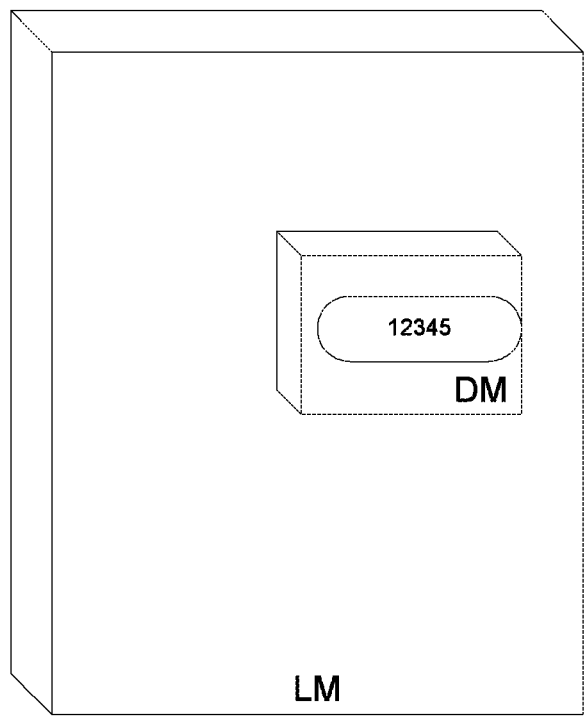
FIG. 2 shows the legacy meter LM of FIG. 1 extended with the detachable monitoring device DM operationally connected to the metering usage display DISP of the legacy meter.

Referring to FIG. 1, a secure detachable utility monitoring device DM is shown as being connectable in a removable manner to a legacy meter LM, also referred to as utility meter, for controlling a utility usage consumption, such as electrical power consumption, water or gas consumptions. The illustrated legacy meter implements the conventional metering usage display DISP as well as an optional metering usage electrical reading connector RD. The legacy meter or utility metering apparatus permanently measures at least one utility usage consumption while the detachable metering monitoring device DM reads this utility usage consumption, on a regular basis. To this end and according to one embodiment, the legacy meter LM can be extended with a detachable monitoring device DM operationally connected to the metering usage display as shown in FIG. 2. The detachable monitoring device illustrated here includes an OCR reading interface and reports the legacy meter display onto its own display to enable further manual reading of the metering value.

Figure 3:
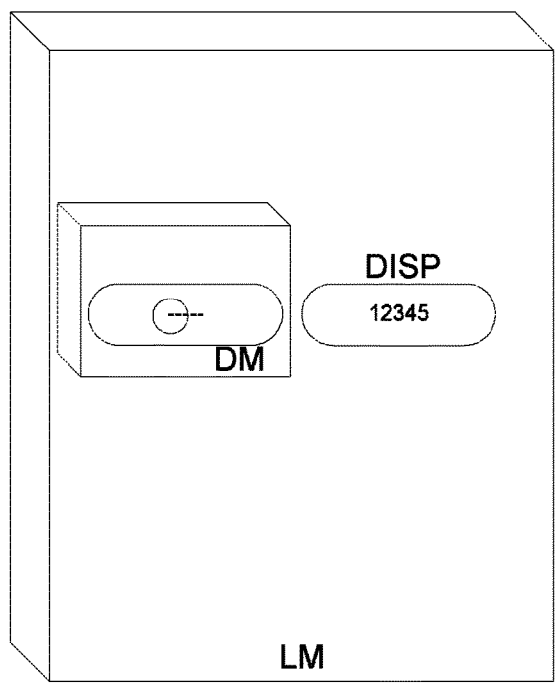
FIG. 3 shows the legacy meter LM of FIG. 1 extended with the detachable monitoring device DM operationally connected to the optional metering usage electrical reading connector RD of the legacy meter.

Alternately and as shown in FIG. 3, the legacy meter LM can be extended with a detachable monitoring device DM operationally connected to the optional metering usage electrical reading connector RD. The detachable monitoring device illustrated here complies with the relevant metering usage communication industrial standard such as IEC1107 or IEC61107, FLAG, ANSI C12.18 for optical ports or ANSI C12.21 for modem ports.

Figure 4:
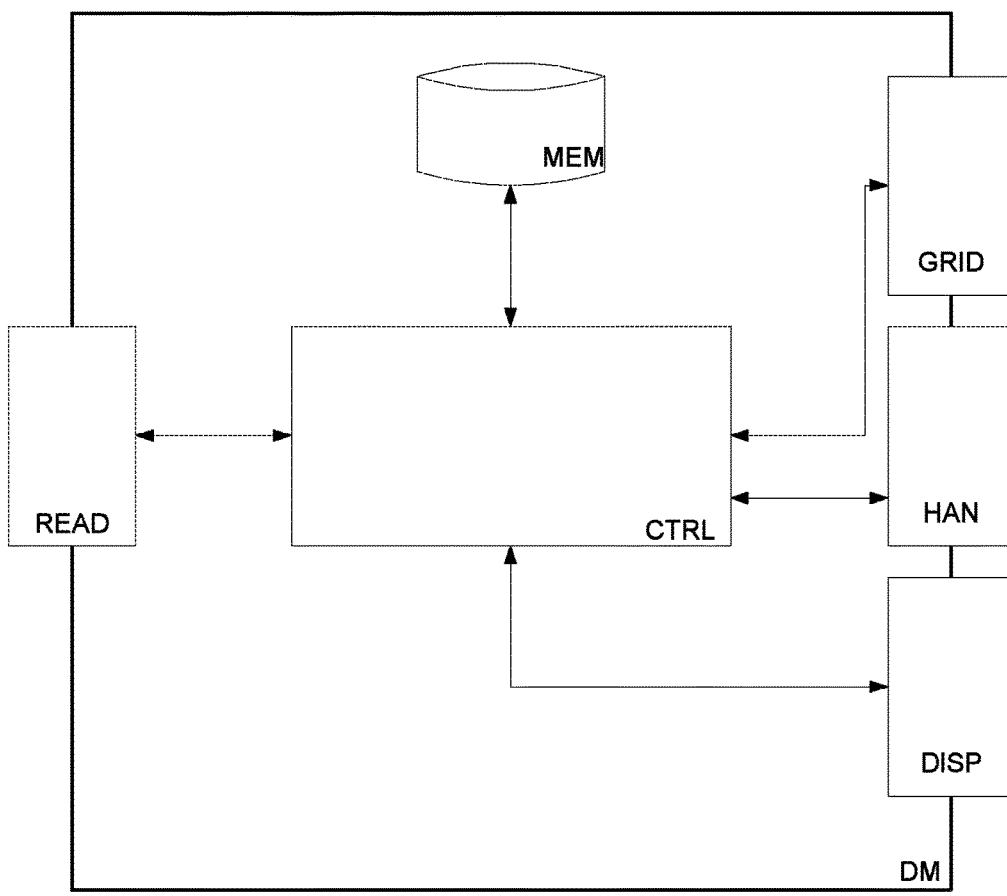
FIG. 4 shows a detachable monitoring device DM with its main components and interfaces.

The detachable monitoring device DM shown in FIG. 4 comprises a usage reading interface READ to acquire a utility consumption value metered by the legacy meter LM in accordance with any of the above described form, a usage memory buffer MEM for storing at least temporarily utility consumption values read by the usage reading interface READ, a remote utility monitoring interface GRID for reporting at least these utility consumption values to a remote management center, an optional home area network interface HAN for optionally connecting a HAN device processing at least a part of data read by the reading interface, an optional visual display DISP and a central processor CTRL in charge with the controlling the above components.

Figure 5:
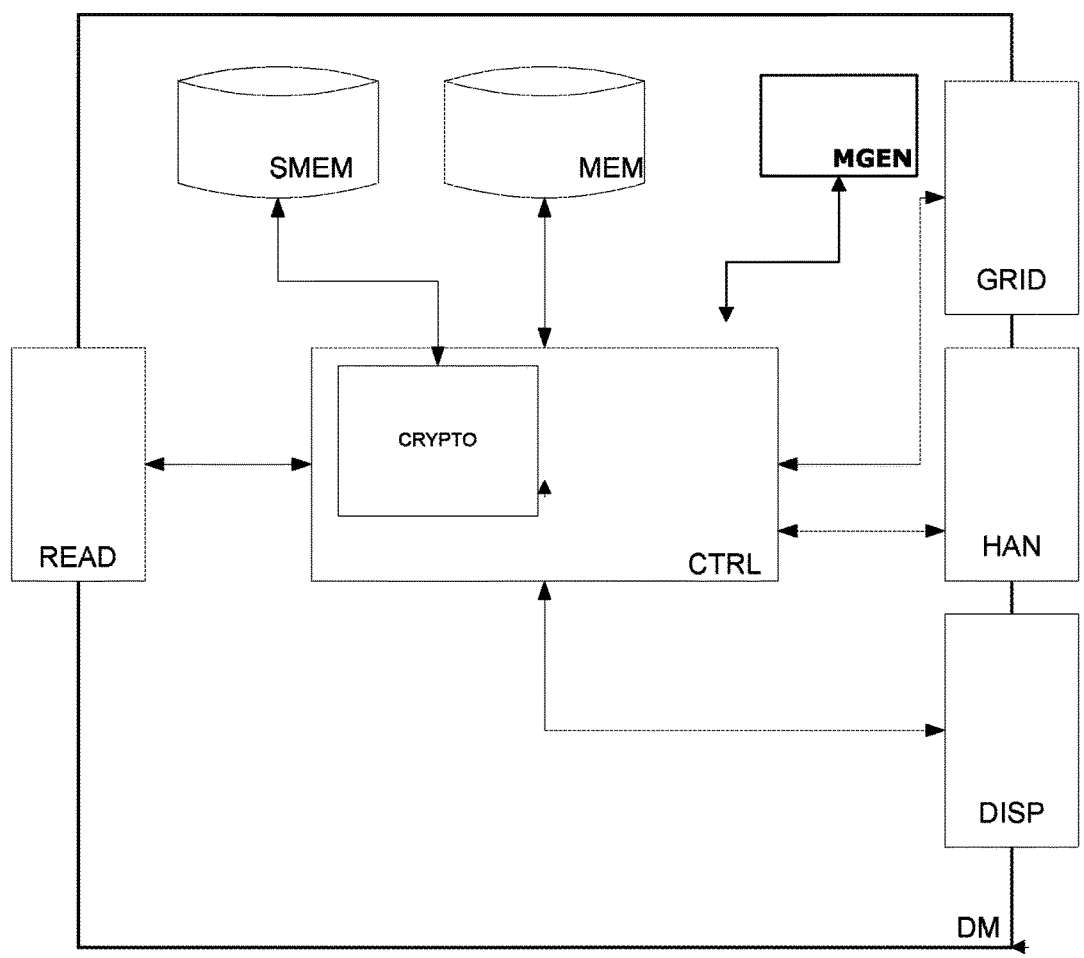
FIG. 5 shows the detachable monitoring device DM of FIG. 4 including a crypto processor CRYPTO in connection with a secure memory SMEM.

Referring to FIG. 5, the latter shows the detachable monitoring device DM of FIG. 4 further comprising a crypto processor CRYPTO providing cryptographic functionalities supported by the central processor CTRL. The crypto processor CRYPTO can generate a cryptogram from information data comprising at least the utility consumption value. According to the preferred embodiment, this cryptogram is encrypted with a personal key of the detachable metering monitoring device DM. Owing to the crypto processor, the utility consumption value read by the usage reading interface READ can be input into a cryptographic function in order to get an encrypted data that is not readable without knowing secret information. For this reason, the crypto processor is in connection with a secure memory SMEM to store sensitive information such as secret cryptographic keys and a unique identifier ID belonging to the detachable metering monitoring device DM (or to the utility meter LM). The crypto processor implements various cryptographic algorithms such as for instance, but not limited to, AES, IDEA-NXT, RSA, SHA-256, ECC, etc. The crypto processor is also the single component able to interact with the secure memory both in reading and writing. The detachable monitoring device DM also comprises a message generator MGEN for generating reporting messages that have to be sent to the remote management center by means of the communication network interface GRID. These reporting messages comprise, in particular, information messages which include at least the cryptogram and the aforementioned unique identifier ID.

The usage memory buffer MEM is able to buffer the utility consumption values in view to report them to a utility usage monitoring infrastructure (such a remote management center) through a communication interface.

The information data used as input for generating the cryptogram may further comprise a predefined complementary data, for instance a constant. Information data may further comprise the unique identifier ID of the detachable metering monitoring device. Information messages sent by this device may further comprise any information about this device, for instance its status or information about the version of this device, in particular the version of its firmware. It could be also possible to send information relating to the utility consumption, e.g. in view to collect statistical data or for any other purposes.

The above-mentioned cryptogram could be a result of a hash function (or an XOR function) on the information data. In this case, the information message further includes the utility consumption value.

The personal key pertaining to the device of the present invention may further be an asymmetric key in a public/private encryption scheme, the remote management center having the corresponding asymmetric key. Thus, the private key and the public key forming together a pair of keys which are used to encrypt and to decrypt the exchanged messages.

The detachable monitoring device DM is appended to the legacy meter shown in FIG. 1 by means of a meter interface, in particular the usage reading interface READ which can take various forms to adapt to the meter technology: OCR-reading for older legacy meters, standard optical or modem interface reading for more recent legacy meters, and wireless or power line communications based on smart metering standards in order to enable future smart meters security renewability. The monitoring device may implement any, a subset or all of the latter possible interfaces as dictated by cost factors, implementation issues (e.g. battery lifetime) and market needs.

To support old legacy meters without electrical reading interface can only be visually read, the detachable monitoring device DM from FIG. 2 is connected to the display of the legacy meter LM and the means to acquire the utility consumption value of the monitoring device comprise an OCR reading interface to read this utility consumption. The device also reports the legacy meter display onto its own display to enable further manual reading of the metering value.

Alternately, in the more recent legacy meter LM from FIG. 3 the detachable monitoring device DM can be operationally connected to the metering usage electrical reading connector RD. Thus, means to acquire the utility consumption value, such as the usage reading interface READ in the device of the present invention, could comprise an electrical connection provided by the utility meter for transmitting the utility consumption value.

The detachable monitoring device DM is attached to the legacy meter by any means of mechanical fasteners like screws, or chemical fasteners like glue, or magnets. Moreover, it is desirable that the detachable monitoring device DM is further bound to the legacy meter by means of a seal for tamper evidence purposes, so that only authorized personnel can connect/disconnect the detachable monitoring device DM to/from the legacy meter LM.

Both the crypto processor CRYPTO and the secure memory SMEM have to be tamper proof against various types of attacks. To this end, the crypto processor and secure memory may be implemented as dedicated silicon circuitry or integrated into the monitoring device hardware under careful isolation from the main processing and communication facilities as shown in FIG. 5. The crypto processor may include custom cryptography logic blocks. It is also possible to emulate the security module SM functionality in an isolated software component by means of obfuscation and white box cryptography software security technologies.

In order to facilitate the crypto processor and secure memory implementation, security design segmentation and personalization in line with state of the art industrial practices and processes, in another embodiment, the corresponding security functionality is physically isolated by implementing it into a separate security module.

Figure 6:
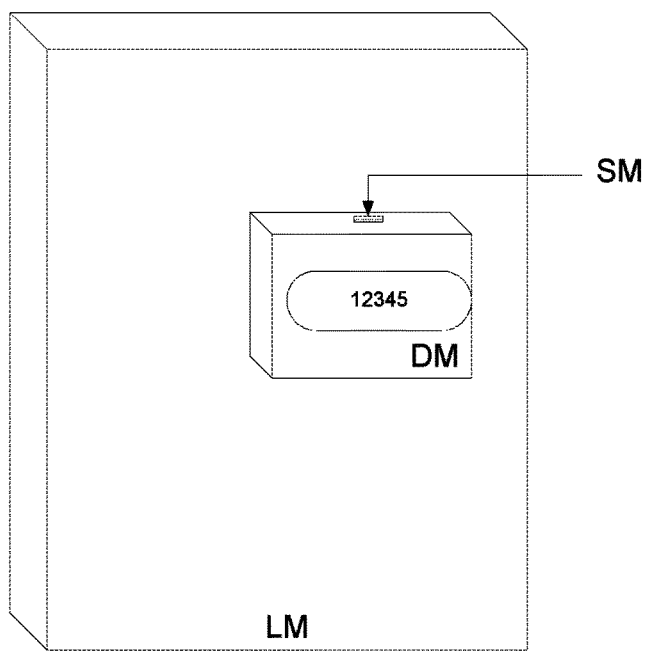
FIG. 6 shows detachable monitoring device DM operationally connected to a legacy meter LM, where the detachable monitoring device DM further includes a security module interface SM.

In one embodiment shown in FIG. 6, the legacy meter LM is extended with a detachable monitoring device DM operationally connected to it and the detachable monitoring device DM further include a security module interface SM suitable for instance to host a smartcard, possibly in the SIM card form factor.

Figure 7:
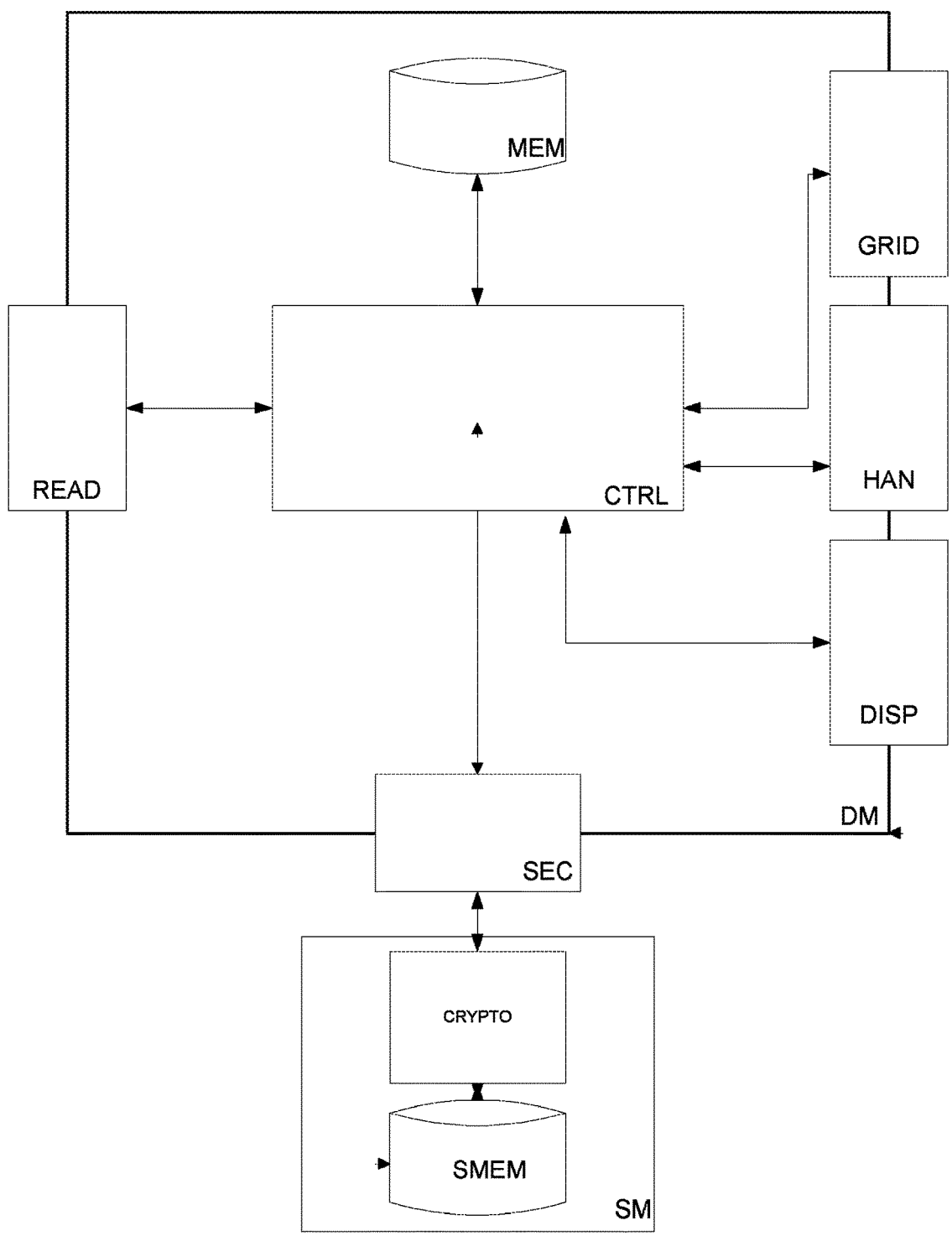
FIG. 7 shows the detachable monitoring device DM of FIG. 4 together with a security module SM connected through a dedicated interfaces SEC.

In accordance to another embodiment, FIG. 7 shows a detachable monitoring device DM, similar to that of FIG. 4, where the central processor CTRL also interacts with a security module SM though a dedicated interface SEC. The security module SM implements the crypto processor functionality CRYPTO in connection with the secure memory SMEM to store sensitive information such as secret cryptographic keys at least.

Beyond its security design and manufacturing advantages, this separate security module enables to separate the security renewability from the reading and reporting monitoring functionality and communication device renewability. As a smartcard or SIM card form factor is thin enough to be conveyed to the end user by regular mail at the same cost as a simple letter, and the security module can be renewed by the end user without any intervention on the meter itself, i.e. without safety concerns, and furthermore without requiring the utility personnel on-site intervention to unseal and renew the detachable monitoring device in the case where it is sealed.

In addition, for utility markets requiring a prepayment business model support, the detachable monitoring device DM may either embed a prepayment control functionality connected at regular intervals to the remote utility server subscriber authorization system through the central processor CTRL and the communication network interface GRID, or a standard contact-based or contactless interface SEC to a prepayment smartcard SM, in various possible form factors such as, but not limited to, ISO7816, SIM, SD, µSD, MMC.

In a further embodiment, the security module can be combined with a Home Area Network HAN interface in order to read, record and securely report the data from further HAN devices to a further Meter Data Management System. This interface is preferably of wireless and low-power consumption nature such as Zigbee.

In another embodiment, in order to manage the various data and control queries with possibly complex metering business models in a secure way while supporting broadcast messaging optimization, the security module preferably implements a relational database.

In another embodiment, in order to ensure security maintenance and renewability over time, the detachable monitoring device DM implements a secure boot mechanism for its controller processor CTRL under close control by the security module SM. In the absence or malfunction of the security module SM, no or limited communication functionality is supported so that an alarm is triggered on the utility infrastructure side.

Another advantage of the device of the present invention is to provide enhanced management of the consumption by enabling management of more than one counters activated according to a time schedule or by reception of command messages.

Another advantage of the detachable metering device of the present invention is to provide enhanced management of the consumption by enabling to differentiate the utility consumptions metered under different tariffs and to totalize each of these utility consumptions. This purpose may be reached for instance by using a plurality of tariff counters, each of them being used to count the utility consumption under a predetermined tariff. The device can have different states (e.g. a normal operating state or mode, a lowest operating state, a disrupted operating state, etc. . . . ) which can correspond to the plurality tariffs applicable. The assigning of a predetermined tariff by a selecting unit SELECT may depend on a time scheduler, on the reception of a command message from the remote management center or can be an action resulting from a switching of the operating mode of the detachable metering device.

According to a preferred embodiment, the detachable metering device DM comprises a last updated memory to store the utility consumption value while at least one tariff memory is updated. The selecting unit SELECT or any selection means is used for defining the use of a current predetermined tariff among different predetermined tariffs. This selecting unit can switch from a predetermined tariff to another one. To this end, the detachable metering monitoring device DM comprises a plurality of tariff memories TMEM to store the utility consumption according to different states of the device DM, where a predetermined tariff is assigned to each state. In particular, this device comprises at least two tariff memories in order to memorize sums (i.e. cumulated values) of utility consumptions metered under these different predetermined tariffs; each tariff memory being assigned for counting the utility consumption under one predetermined tariff. Finally, this device comprises a consumption calculator CALC or any means firstly to calculate a current consumption value from the last updated memory and the acquired utility consumption value read by the usage reading interface READ. To this end, the consumption calculator CALC subtracts the utility consumption value stored in the last updated memory from the acquired utility consumption value. Then, a memory updating unit UPMEM updates the value stored in the tariff memory TMEM corresponding to the current predetermined tariff (i.e. selected by the selecting unit SELECT) by adding this current consumption value. Then, the memory updating unit UPMEM reloads the last updated memory with the value metered during said acquisition step. Preferably, the memory updating unit UPMEM comprises a processing unit to read the selected tariff memory, to add the current consumption value to the selected tariff memory and to write said sum to the selected tariff memory.

The values stored in the corresponding tariff memories TMEM relating to consumptions carried out under predetermined tariffs can be part of the information data used to generate the cryptogram included in the information message sent to the remote management center.

According to another embodiment, the device DM of the present invention, in particular the communication network interface GRID, further comprises a reception unit RECEIV or any means for receiving at least one message sent by the remote management center and an authenticating unit AUTH or any means to authenticate this message by using the personal key of this device DM. In case of successful authentication, these means may be able to execute commands included in this message. If authentication failed, the message could be merely dismissed or another action could be triggered. For instance, the message received by the reception unit RECEIV of the device DM from the management center could be a command message ordering means for defining the use of the current predetermined tariff to use a higher tariff than the current one, e.g. the highest available tariff. Alternatively, the command message could order means for defining the use of the current predetermined tariff to switch the tariffs in accordance with a time schedule. Such a time schedule could be stored, for instance, in the first secure memory of the detachable metering monitoring device and could be updated via a message sent by the management center.

According to another embodiment, the device of the present invention further comprises a validity counter VCOUNT or any means to increment/decrement a validity value according to the utility consumption or a time (e.g. a duration), a resetting unit RESET or any means to update or substitute the value of the validity counter by a new validity value, and a switch SWIT or any means to switch the operating of the device DM from a normal operating mode to a disrupted operating mode, depending on whether the value of the validity counter reaches at least one predetermined threshold value.

The disrupted operating mode could force means for defining the use of a current predetermined tariff to use a tariff higher than the current predetermined tariff, for instance the highest tariff.

The validity counter VCOUNT could be a time counter or a check pulses counter, incremented according to an internal clock. In another embodiment, the validity counter could be incremented according to the consumption of the utility so that the validity counter could be based on counting of the utility consumption (e.g. kWh for electrical power consumption or $m^3$ for gas or water consumption).

Besides, the personal key used by means to authenticate the renewal message could be a private key pertaining to the detachable metering monitoring device and, in this case, the renewal message would be encrypted with a corresponding public key of this device.

The new validity value used to reload the validity counter and/or the threshold value which allows switching between the normal operating mode and the disrupted operating mode can be included within the renewal message or can be prestored in the first secure memory SMEM of the detachable metering monitoring device DM.

The renewal message may include updating information about this device, for instance information relating to its firmware.

Before switching from the normal mode to another mode, e.g. the disrupted mode, it could further be possible to alert the consumer, via a message displayed on the screen of the device or via any other means (sound, light, etc. . . . ), that the validity counter of his device has reached a critical level. Such an alerting means or alerting unit ALERT would be useful to warn the consumer from any inconvenience, typically the interruption of the utility consumption or any increasing tariff.

The utility which is metered by the utility meter could be electric power, gas or water. Besides, it could be also possible to imagine that the utility meter, to which the device of the present invention is attached in a removable manner, could be able to meter several utility consumptions, such as electric power consumption and water or gas if needed. In this case, the device of the present invention could be adapted to deal with these consumptions instead of having several devices, i.e. one for each utility consumption.

The invention claimed is:

1. A detachable metering monitoring device, comprising a usage reading interface to acquire a utility consumption value metered by said utility meter connectable with a utility meter, to control at least one utility consumption metered by the utility meter, the detachable metering monitoring device further comprising:
   a connectable security module SM comprising a first secure memory to store at least a unique identifier ID and a personal key, both pertaining to said security module SM, a crypto processor to generate a cryptogram from information data comprising at least the utility consumption value, said cryptogram being encrypted with said personal key, a message generator to generate an information message including at least said cryptogram and the unique identifier ID.

2. The detachable metering monitoring device of claim 1, wherein said detachable metering monitoring system further comprising an interface with the connectable security module SM and a communication network interface including a sending unit to send said information message to a remote management center.

3. The detachable metering monitoring device of claim 1, wherein said information data further comprises a predefined complementary data.

4. The detachable metering monitoring device of claim 1, wherein said information data further comprises the unique identifier ID.

5. The detachable metering monitoring device of claim 1, wherein the cryptogram is a result of a hash function on the information data, said information message further comprising the utility consumption value.

6. The detachable metering monitoring device of claim 1, wherein said information message further includes a firmware version of said detachable metering monitoring device.

7. The detachable metering monitoring device of claim 1, wherein the personal key is an asymmetric key in a public/private encryption scheme, the remote management center having the corresponding asymmetric key.

8. The detachable metering monitoring device of claim 1, wherein the usage reading interface comprises an electrical connection provided by said utility meter to transmit the utility consumption value.

9. The detachable metering monitoring device of claim 1, wherein the usage reading interface comprises an OCR reading interface to read the utility consumption metered by said utility meter.

10. The detachable metering monitoring device of claim 1, further comprising:
    plurality of tariff memories to store the utility consumption according to different states of the detachable metering monitoring device,
    a last updated memory to store the utility consumption value while at least one tariff memory is updated,
    a selecting unit to select one of the tariff memories according to the current state,
    a consumption calculator to calculate a current consumption value from the last updated memory and the acquired utility consumption value, and
    a memory updating unit to apply the calculated current consumption value to the tariff memory selected by the selecting unit and to update the last updated memory with the acquired utility consumption value.

11. The detachable metering monitoring device of claim 8, wherein the selecting unit to select the state of the device and the tariff memory is driven by a time scheduler.

12. The detachable metering monitoring device of claim 10, wherein the communication network interface comprises a reception unit and wherein the selecting unit, for selecting one of the tariff memory and the state of the detachable metering monitoring device, is driven by the reception of a message from the remote management center.

13. The detachable metering monitoring device of claim 10, wherein the memory updating unit comprises a processing unit to read the selected tariff memory, to add the current consumption value to the selected tariff memory and to write said sum to the selected tariff memory.

14. The detachable metering monitoring device of claim 10, wherein said information message further comprises the values of the tariff memories.

15. The detachable metering monitoring device of claim 1, further comprising:
    an authenticating unit to authenticate messages received from the remote management center through the reception unit by using said personal key and, in case of successful authentication, to execute the authenticated messages.

16. The detachable metering monitoring device of claim 1, wherein said message is a renewal message and wherein said detachable metering monitoring device further comprises:
    a validity counter to increment/decrement a validity value according to the utility consumption or a time,
    a resetting unit to substitute a value of the validity counter by a new value, and
    a switch to switch the functioning of the detachable metering monitoring device from a standard functioning mode to a disrupted functioning mode, depending on whether the value of the validity counter reaches at least one threshold value.

17. The detachable metering monitoring device of claim 10, wherein the memory updating unit comprises a processing unit to read the selected tariff memory, to add the current consumption value to the selected tariff memory and to write said sum to the selected tariff memory.

18. The detachable metering monitoring device of claim 10, wherein said information message further comprises the values of the tariff memories.

19. The detachable metering monitoring device of claim 10, wherein the memory updating unit comprises a processing unit to read the selected tariff memory, to add the current consumption value to the selected tariff memory and to write said sum to the selected tariff memory.

20. The detachable metering monitoring device of claim 10, wherein said information message further comprises the values of the tariff memories.

* * * * *